Oct. 6, 1959
S. H. NORTON
2,907,312
VALVE ROTATING DEVICE
Filed May 9, 1958
2 Sheets-Sheet 1
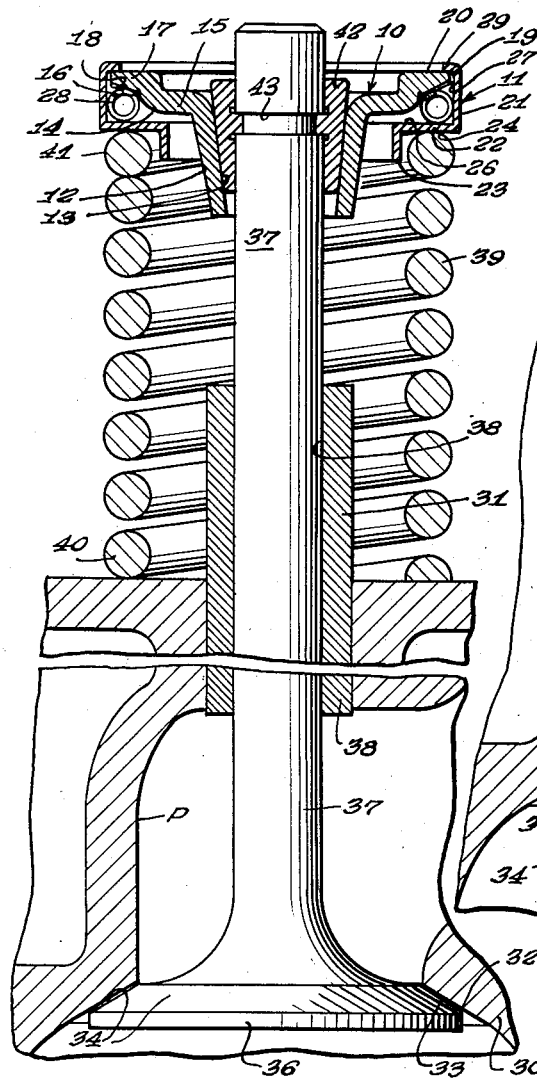
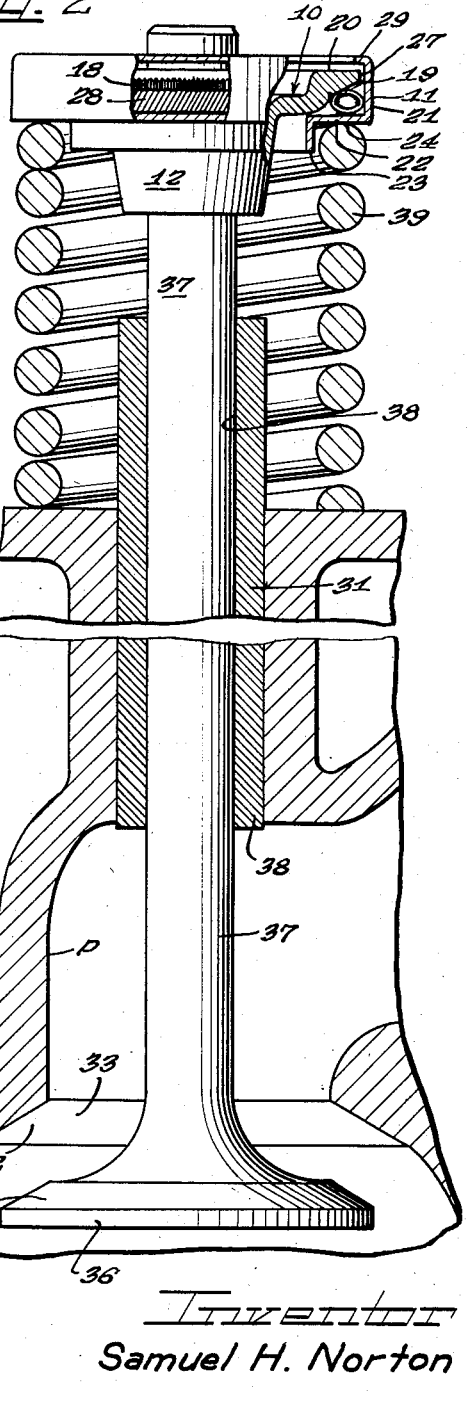
Inventor
Samuel H. Norton Oct. 6, 1959    S. H. NORTON    2,907,312
VALVE ROTATING DEVICE
Filed May 9, 1958    2 Sheets-Sheet 2

Inventor
Samuel H. Norton
By Hill, Sherman, Meroni, Gross & Simpson Attys

United States Patent Office 2,907,312
Patented Oct. 6, 1959

2,907,312

VALVE ROTATING DEVICE

Samuel H. Norton, University Heights, Ohio, assignor to Thompson Ramo Woolridge Inc., a corporation of Ohio Application May 9, 1958, Serial No. 734,272

9 Claims. (Cl. 123—90)

This invention relates to improvements in a three (3) part valve rotating device of the type wherein two separated axially loaded relatively rotatable parts of a poppet valve assembly are interconnected by spring means including helically wound coiled loops or coils arranged to transmit axial loads between the separated parts across the transverse axis of the loops, and wherein the proper limit of turnover of the spring loops is effected by means for limiting deflection using the spring coils themselves.

Valve-rotating devices on the valves of internal combustion engines are highly desirable since cyclic operation and rotation of the valves during the course of engine running assists in eliminating valve burning as well as wearing, pitting and stem-galling and scoring. In rotating devices of the type using spring loops, too great a turnover of the spring loops will over tax the spring and cause breakage.

It is therefore an object of the present invention to provide an improved method and means for rotating an engine valve which limits spring deflection, increases durability and simplifies the construction.

Another object of the present invention is to provide a rotating device for valves which will not turn immediately as the valve is being raised off its seat or when it is being lowered onto its seat, thereby eliminating excessive valve and valve seat wear.

Still another object of the present invention is to provide a valve-rotating device utilizing coiled loops or spring coils which will function between axially adjacent relatively rotatable parts in a manner similar to the action of an overrunning clutch, but where the angularity of the spring coils causes them to form a continuous band which will fold over only within controlled limits.

A further object of the present invention is to provide improvements in a valve-rotating device of the type utilizing tiltable spring coils transmitting axial loads transversely of the spring coiling axis, and wherein the coils themselves are used to limit deflection.

Many other advantages and additional objects of the present invention will become manifest to those versed in the art upon making reference to the detailed description which follows and the accompanying sheets of drawings in which preferred structural embodiments incorporating the principles of the present invention are shown by way of illustrative example. It is believed that the methods of the present invention will be most clearly understood from a description and an understanding of the apparatus provided for practicing the steps of the methods disclosed herein.

On the drawings:

Figures 1 and 2 are fragmentary views showing a valve-rotating device according to the principles of the present invention applied to the poppet valve assembly of an internal combustion engine, and with parts broken away and with parts shown in cross-section to illustrate the positioning of the components when the valve is raised during the cyclic operation thereof, Figure 1 showing the valve-rotating device at the start of a typical valve-rotating cycle and Figure 2 showing the components of the valve-rotating device at the end of a valve-rotating period;

Figure 4:
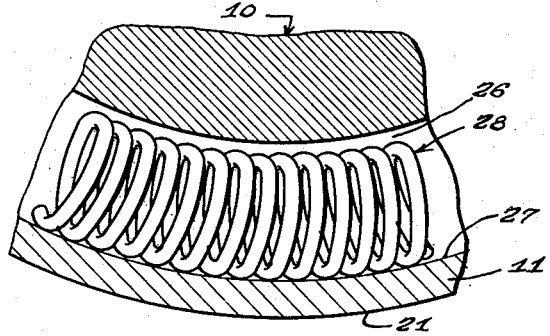
Figure 4 is a fragmentary cross-sectional view, with parts shown in elevation, taken through the valve-rotating device substantially along the line IV—IV of Figure 3 before the coils or loops are tipped due to increased axial loads.

Axially adjacent relatively rotatable parts are provided respectively by a valve cap indicated at 10 and a collar member indicated at 11. The valve cap 10 has a generally cylindrical body portion 12 which is axially tapered to provide a bore 13 through which the end of a valve stem is passed. Near the top of the valve cap 10 there is provided an annular shoulder 15 having a lower wall 14 and an annular axially extending wall 16. Extending radially outwardly from the annular shoulder 15 is a flange 17 shaped to provide a tapered end wall 18 forming an annular conically-shaped bearing surface. The end wall or bearing surface 18 terminates in an axially extending outer peripheral edge 19. The valve cap 10 has a top surface indicated at 20.

The collar member 11 includes a generally cylindrical body portion 21 which, in effect, forms a concave side wall concentrically outwardly of the common axis on which the axially adjacent parts are disposed and concentrically outwardly of the end wall or bearing surface 18. The collar member 11 is flanged to provide a flat end wall 22 offset at right angles to the side wall 21. The end wall 22 is flanged as at 23, thereby forming a pilot portion which extends axially with respect to the parts and which is spaced concentrically outwardly of the body portion 12 of the valve cap 10.

One face of the flange 22 provides a valve spring seating surface 24, while the inside flat inner surface of the flange 22 is nidicated at 26. The flat inner surface 26 is axially spaced from the bearing surface 18 and lies adjacent a concave inner surface indicated at 27 provided by the side wall 21.

Interposed between the parts herein illustrated as constituting the valve cap 10 and the collar member 11, are spring means providing a plurality of helically coiled loops or spring coils. It will be noted that the bearing surface 18, together with the flat inner surface 26 and the concave surface 27 together form an annular space or recess means. Thus, the spring means are conveniently located in such space and in the present form of the invention constitutes a coiled spring 28 formed into a generally annular loop with the opposite ends either abutting or spaced in near abutting relation.

When the three parts of the valve-rotating device of the present invention are assembled, namely, the valve cap 10, the collar 11 and the spring means 28, the cap 10 is placed over the spring means 28 and is pressed down until all of the coils are subjected to a pressure approximately equal in amount to a contemplated minimum axial load, for example, normal valve spring pressure. At the same time, the valve cap 10 is turned to the left for a left-hand loop spring and to the right for a right-hand loop spring until the coils of the spring means 28 collapse or tip over. The pressure is then relieved until it is slightly greater in amount than minimum contemplated axial load, whereupon the rim of the collar 21 indicated at 29 is axially offset by spinning or crimping over the top surface 20 of the valve cap 10 until the valve cap 10 cannot be raised by the strength of the spring means 28. Thus, the valve cap 10, the collar 11 and the spring coils of the spring means 28 are assembled together in preloaded condition. With the parts thus arranged, it will be understood that the spring means 28 operates to transmit normal spring loads between the collar 11 and the valve cap 10 will normally restrict the parts against relative rotation, but the coils or coiled loops of the spring means 28 are effectively utilized as a means for providing shiftable elements between the relatively rotatable parts 10 and 11. Thus, the spring means 28 comprises a predetermined plurality of helically looped coils or a helically wound coil spring having a multiplicity of individual coils closely spaced with respect to one another when the coils are in an upright position, or prior to tipping due to increased axial loads, so that the helix angle of the individual coils is sufficiently small to permit the spring means 28 to transmit forces in a direction transverse to the longitudinal axis of the spring.

As shown on the drawings, the valve-rotating device of the present invention may be assembled with a poppet valve assembly as may be employed in an internal combustion engine or the like.

In the embodiment shown, an engine part is indicated at 30 which provides a port designated as P having a valve-opening 32 presenting a beveled valve seat 33 regulated by the beveled seating surface 34 of a valve head 36 carried on the end of a valve stem 37. The stem is slidably carried in an engine part 31 by means of a valve stem guide 38. A valve spring 39 has one end 40 bottomed against the engine part 31 and the opposite end indicated at 41 is bottomed against the valve spring seating surface 24 on the flange 22 of the collar 11.

The valve cap 10 is locked adjacent the end of the valve stem 37 by means of a valve stem locking member 42 cooperable with an annular locking groove 43 formed adjacent the end of the stem 37.

Figure 3:
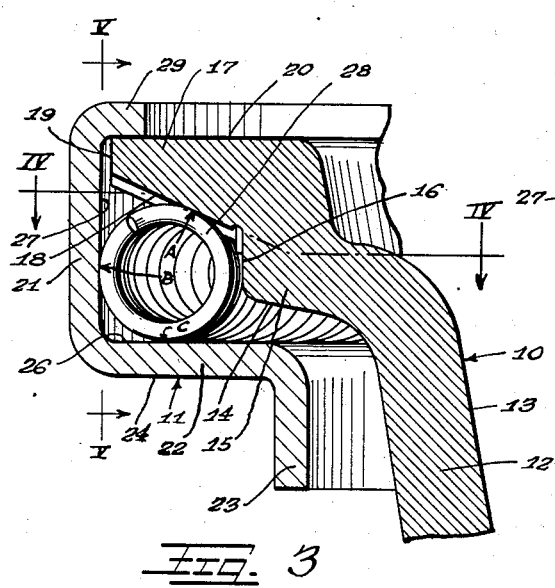
Figure 3 is an enlarged cross-sectional view, fragmentary in part, of the valve-rotating device of this invention.
Figure 5:
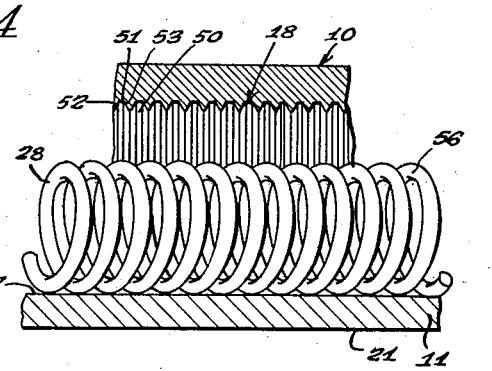
Figure 5 is a side elevational view taken substantially on the line V—V of Figure 3 showing the coils or loops in the same condition as described in connection with Figure 4.
Figure 7:
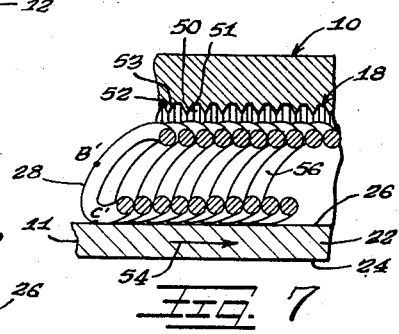
Figure 7 is a view similar to Figure 5, but showing the coils or loops in the condition of Figure 6.

As is more clearly indicated in Figures 3, 5 and 7, the tapered end wall or bearing surface 18 may have a plurality of closely circumferentially spaced grooves 50. Each groove 50 has a bottom 51 and tapered side walls 52 and 53. The grooves correspond in number to the number of spring coils or coiled loops provided by the spring means 28. Thus, when the parts are assembled, pressure is applied to the valve cap 10 positioned over the spring means 28. The spring coils or coiled loops of the spring means 28 are then forced into registration with corresponding slot or grooves 50 formed in the end wall or bearing surface 18.

In three piece valve rotators prior to this invention and utilizing the spring coil arrangement herein above described, a stop was provided to limit the turnover of the spring as too great a turnover would over tax the spring and cause breakage of the same. For example, the surface 14 of the shoulder 15 on the valve cap 10 would be spaced in a predetermined relationship relative to the surface 26 on the wall 22 of the collar 11. Thus, engagement between the surface 14 and the surface 26 would prevent too great a turnover and would safeguard the spring.

With such an arrangement, however, in order to maintain the proper limit of turnover, the parts, and specifically the valve cap 10 and the collar 11, required close tolerances between the surfaces 14 and 26 on the respective shoulder 15 and the wall 22 and such close tolerances are difficult and expensive to maintain in an economically produced unit utilizing stampings or other metal worked components adaptable to mass production methods.

In accordance with the principles of the present invention, the so-called "flange stop" is eliminated altogether and an improved deflection limiting means is provided which utilizes the spring coils themselves. Referring particularly to Figure 3, it will be noted that the lower wall 14 of the shoulder 15 extends generally upwardly and outwardly but is not necessarily parallel to surface 26 of the collar 11 nor is any predetermined tolerance limit effected between the lower wall 14 and the surface 26. As a matter of fact, the spacing demension between the lower wall 14 and 26 in accordance with the present invention is of sufficient extent so that interengagement therebetween will be avoided during the operation of the device.

To limit the deflection in accordance with the principles of the present invention, the size of the spring wire and the number of coils of the spring 28 is made sufficiently great so that when the coils are folded over, the angularity thereof causes them to contact each other and form a continuous band of connecting spring coils, which coils will then fold over only to a degree determined by the valve spring resisting force.

Figure 6:
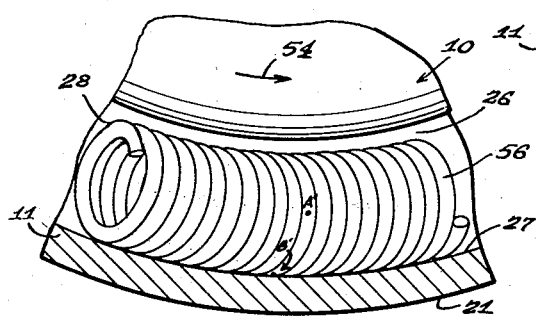
Figure 6 is a view similar to Figure 4, but showing the coils or loops after they have been tipped over by an increased axial load transmitted between the axially adjacent parts.

In the drawings, the spring is shown in its upright position in Figures 4 and 5. In Figures 6 and 7 the spring is shown in the tipped over position and it will be noted that in the tipped over position of Figures 6 and 7 the spring is virtually "solid" along its inner periphery, since the individual coils are contacting each other and form a continuous band of connecting spring coils.

It will be noted from reference to Figures 6 and 7 that when the coils 56 are tipped or folded over or compressed that each individual coil of the spring means 28 is in continuous abutment with an adjacent coil. The coils 56 may accordingly be considered "closely packed" along the inside of spring means 28 since there is essentially no spacing therebetween except along the outer periphery of same due to the flare of the coils because of their radial spacing when the valve 37 is in the open position substantially as shown in Figure 2. To accomplish the closely packed condition of the coils 56 of the spring means 28, a predetermined diameter of spring wire and number of coils are employed and the number thereof will of course depend upon the extent of the annular space or recess means defined by the bearing surface 18, the flat inner surface 26 and the concave surface 27 within the valve cap 10 and collar member 11. By so selecting the wire and number of coils providing the spring means 28, variations may be obtained in the amount of angularity which will cause the coils to contact each other during compression or folding over thereof. The degree of angularity of the coils 56 is of course further determined by the resisting force provided by the valve spring 39; however, by proper selection of the size of wire and number of coils 56 in the spring means 28, said spring means when compressed provides an axial stop limiting the relative axial movement of the parts 10 and 11 without dependence upon stop means provided by the abutment surface 14 on the annular shoulder 15 and the inner portion of the flat inner surface 26 formed on the flange 22.

In operation, the valve is closed as shown in Figure 1 and the spring 28 is positioned with the coils in upright position similar to the detailed views of Figures 4 and 5 as well as Figure 3. Thus, each individual coil 56 contacts the valve cap at point A and the collar 11 at point B and the flat inner surface 26 at point C. In this position normal spring forces exerted by the coil spring 39 are transmitted between the parts through the spring coils. As the valve tends to move toward the open position of Figure 2, an increased force is exerted. As the valve spring 39 is compressed during the valve opening movement, greater and greater load is placed on the coils or loops 56 of the spring means 28 until the coils 56 tip forward as at A' (Figure 6) and are held back at B' (Figure 7). Thus, as the coils tip over at A' and pivot at C', the valve cap 10 will be turned.

When the pressure of the valve spring 39 decreases during the valve closing movement, the coils 56 of the spring means 28 will straighten up and raise the valve cap 10 back to its original position.

It will be apparent that by preselection of the number of coils and proper size of spring wire, providing the spring means 28 to limit turnover, and thus avoid over-stressing of the spring coils, substantial economies in manufacture and assembly of the parts are obtained. Specifically, since tolerances may be reduced, there results a greater flexibility in utilization of manufacturing techniques and less selective assembly of parts to assure a proper fit therebetween.

Although various minor structural modifications might be suggested by those versed in the art, it should be understood that I wish to embody within the scope of the patent warranted hereon all such modifications as reasonably and properly come within the scope of my contribution to the art.

I claim as my invention:

1. The method of rotating two axially adjacent relatively rotatable parts which includes the steps of preloading the parts to restrict rotation therebetween at minimum load by axially compressing the transversely aligned coils of a helically coiled spring means between axially spaced first surfaces of the adjoining parts having second surfaces axially spaced relatively more closely than the first surfaces, cyclically subjecting the parts to increased axial load, tipping the coils in a circumferentially extending direction in response to greater than minimum load to remove the restriction against rotation on the parts and to rotatably drive the parts with respect to one another, and moving all of the coils into abutting contact with one another to form a continuous circumferential band of connected spring coils maintaining the second surfaces of the parts spaced from one another during loading and unloading thereof, thereby limiting the turnover of the coils by means of the coils themselves rather than by contact between the second surfaces of said parts.

2. The use of a spring means having a plurality of helically wound coils as a rotating device which includes the steps of preloading the coils by confining the coils transversely of the coiling axis and between confronting spaced first surfaces of axially adjacent relatively rotatable parts having confronting second surfaces spaced relatively more closely than the first surfaces, thereby to restrict the parts against rotation below a predetermined minimum load, cyclically loading and unloading the parts with a load of a value above said predetermined minimum load and tipping the coils in a circumferentially extending direction to remove the restriction against rotation and to rotatably drive the parts with respect to one another, and moving all of the coils into abutting contact with one another to form a continuous circumferential band of connected spring coils maintaining the confronting second surfaces spaced from one another during loading and unloading of the parts, thereby limiting the turnover of the coils by means of the coils themselves rather than by contact between the confronting second surfaces of said parts.

3. In combination, axially adjacent relatively rotatable parts, and spring means providing a plurality of helically wound tiltable coils, said parts having axially spaced first surfaces transmitting axial load between the parts through said spring means transversely of the coiling axis of the coils, one of said parts having a concave wall concentrically outwardly of said coils alternately gripping and slipping with relationship to said coils during the tilting action of the coils to effect incremental unidirectional angular movement with respect to the other part in response to changing axial loads, the coils being sufficient in number to move into continuous abutting relation upon tilting and forming together with one another a continuous band of connected spring coils limiting deflection of the spring means, one of said parts having a second surface spaced axially from the first surface of the other part a relatively lesser distance than the axial spacing of the first surfaces of said parts and maintained spaced therefrom by the abutting connected spring coils, whereby deflection of the spring means is limited by the coils themselves rather than by contact between the relatively more closely spaced surfaces of the parts.

4. In a valve-rotating device, an engine part, a valve part reciprocably and rotatably carried by said engine part and load-transmitting means inter-connecting said valve part and said engine part including two relatively rotatable inner and outer parts having axially spaced first surfaces, a valve spring bottomed against one of said inner and outer parts, the other of said inner and outer parts being connected with one of said engine and valve parts, and spring means confined between said inner and outer parts, said spring means providing a plurality of helically coiled loops in continuous abutment with one another under greater than minimum load conditions to form continuous connected band of coils for limiting deflection of the spring coils, the other of said inner and outer parts having a second surface spaced axially from the first surface of the one of said inner and outer parts a relatively lesser distance than the axial spacing of the first surfaces of said parts and maintained spaced from one another by the abutting connected spring coils, whereby deflection of the spring means is limited by the coils themselves rather than by contact between the relatively more closely spaced surfaces of the parts.

5. In a valve rotating device, an engine part, a valve part reciprocable and rotatably carried by said engine part and load-transmitting means inter-connecting said valve part and said engine part including two relatively rotatable inner and outer parts having axially spaced first surfaces, a valve spring bottomed against the first surface of one of said inner and outer parts, the other of said inner and outer parts being connected with one of said engine and valve parts, and spring means confined between said inner and outer parts, said spring means comprising a plurality of helically coiled loops sufficient in number to form a deflection limiting continuous band when tipped in a circumferentially extending direction during extension of the valve spring, the other of said inner and outer parts having a second surface spaced axially from the first surface of the one of said inner and outer parts a relatively lesser distance than the axial spacing of the first surfaces of said parts and maintained spaced from one another by the abutting connected spring coils, whereby deflection of the spring means is limited by the coils themselves rather than by contact between the relatively more closely spaced surfaces of the parts.

6. In combination, axially adjacent relatively rotatable parts, and spring means providing a plurality of helically wound tiltable coils, said parts having axially spaced first surfaces transmitting axial load between the parts through said spring means transversely of the coiling axis of the coils, one of said parts having a concave wall concentrically outwardly of said coils alternately gripping and slipping with relationship to said coils during the tilting action of the coils to effect incremental unidirectional angular movement with respect to the other part in response to changing axial loads, said coils being in continuous abutting relation with respect to one another under greater than minimum load conditions and maintaining the axially adjacent relatively rotatable parts axially spaced with respect to one another, one of said parts having a second surface spaced axially from the first surface of the other part a relatively lesser distance than the axial spacing of the first surfaces of said parts and maintained spaced therefrom by the abutting connected spring coils, whereby deflection of the spring means is 7. In combination, axially adjacent relatively rotatable parts, and spring means providing a plurality of helically wound tiltable coils, said parts having axially spaced first surfaces transmitting axial load between the parts through said spring means transversely of the coiling axis of the coils, one of said parts having a concave wall concentrically outwardly of said coils alternately gripping and slipping with relationship to said coils during the tilting action of the coils to effect incremental unidirectional angular movement with respect to the other part in response to changing axial loads, and deflection limiting means comprising a sufficient number of said coils to move into continuous abutting relation with respect to one another under greater than minimum load conditions, one of said parts having a second surface spaced axially from the first surface of the other part a relatively lesser distance than the axial spacing of the first surfaces of said parts and maintained spaced therefrom by the abutting connected spring coils, whereby deflection of the spring means is limited by the coils themselves rather than by contact between the relatively more closely spaced surfaces of the parts.

8. The method of controlling the rotation and limiting the axial shifting of relatively rotatable and axially spaced and shiftable parts, which comprises separating the parts with a helical spring having the coils thereof arranged to tip under axial loading of the parts for accommodating axial movement of the parts toward each other while relatively rotating the parts, and correlating the size and number of coils of the spring with the axial space between the parts to contact the coils together into a continuous solid band, forming a stop against further axial movement of the parts before the parts contact each other.

9. A valve rotating device or the like, which comprises axially spaced relatively rotatable and axially shiftable parts, a coil spring between the parts having the coils thereof holding the parts apart and arranged to tip for relatively rotating the parts when the parts are axially loaded beyond a predetermined load, said coil springs having the number of coils thereof selected to abut each other when tilted to thereby form a solid band limiting further movement of the parts toward each other, and said parts being spaced apart even when said solid band is formed whereby said spring forms a stop limiting axial movement of the parts toward each other.

References Cited in the file of this patent

UNITED STATES PATENTS

| | | |
|---|---|---|
| 2,758,583 | Norton | Aug. 14, 1956 |
| 2,767,696 | Engemann | Oct. 23, 1956 |
| 2,827,029 | Norton | Mar. 18, 1958 |